United States Patent [19]

Agoglia et al.

[11] Patent Number: 4,928,193
[45] Date of Patent: May 22, 1990

[54] DISKETTE DRIVE TYPE DETERMINATION

[75] Inventors: Robert J. Agoglia; Richard A. Dayan, both of Boca Raton; Bruce A. Smith, Delray Beach, all of Fla.

[73] Assignee: International Business Machines Corporation, Armonk, N.Y.

[21] Appl. No.: 830,488

[22] Filed: Feb. 18, 1986

Related U.S. Application Data

[63] Continuation of Ser. No. 630,610, Jul. 13, 1984, abandoned.

[51] Int. Cl.$^5$ .................... G11B 5/55; G11B 21/08; G06F 3/06
[52] U.S. Cl. .................. 360/78.04; 360/48; 360/69; 360/51; 360/78.08; 364/200
[58] Field of Search ... 364/200 MS File, 900 MS File; 360/69, 75, 48, 78, 98, 39, 137, 97, 99, 51, 78.04, 78.08, 78.12-78.14

[56] References Cited

U.S. PATENT DOCUMENTS

| | | | |
|---|---|---|---|
| 3,911,400 | 10/1975 | Levy et al. | 364/200 |
| 4,025,906 | 5/1977 | Riikonen | 364/900 |
| 4,103,338 | 7/1978 | Cizmic et al. | 364/900 |
| 4,162,520 | 7/1979 | Cook et al. | 364/200 |
| 4,183,084 | 1/1980 | Lawson | 364/200 |
| 4,188,664 | 2/1980 | DeShon | 364/200 |
| 4,268,901 | 5/1981 | Subrizi et al. | 364/200 |
| 4,342,081 | 7/1982 | Dubuc | 364/200 |
| 4,434,487 | 2/1984 | Rubinson et al. | 364/200 |
| 4,651,238 | 3/1987 | Ishikura | 360/48 |

FOREIGN PATENT DOCUMENTS 2708760 9/1978 Fed. Rep. of Germany .
59-69856 4/1984 Japan .

OTHER PUBLICATIONS

IBM TDB vol. 20, No. 5, "Multitracks per Inch Actuator/Accessing Arrangement", Paska, 10/77, pp. 1893-1986.
IBM TDB, vol. 24, No. 4, "Head Position Recalibration for Storage Disk Drive", Taylor, 9/81, p. 2054.
IBM Technical Disclosure Bulletin, vol. 27, No. 2, Jul. 1984, p. 1270, "Initial Track . . . File".
IBM Technical Disclosure Bulletin, vol. 24, No. 4, Sep. 1981, "Head Position . . . Drive".
Computer Design, vol. 22, No. 10, Sep. 1983, pp. 63-64, "Controller Mixes . . . Drives".

Primary Examiner—Steven L. Stephan
Assistant Examiner—Steven R. Garland
Attorney, Agent, or Firm—Sughrue, Mion, Zinn, Macpeak & Seas

[57] ABSTRACT

Diskette drive determination in which a read/write head in a diskette drive is instructed to move to a track that is inaccessible on one type of diskette drive. The head is then stepped back toward a track associated with a sensor indicating the positioning of the head over the track. The number of steps required to activate the sensor determines which type of drive is being used.

14 Claims, 7 Drawing Sheets

| DISK DRIVE / MEDIA INSERTED | DSD<br>360 KB<br>48 tpi<br>300 rpm<br>40 TRACKS | HC<br>1.2 MB<br>96 tpi<br>360 rpm<br>80 TRACKS |
|---|---|---|
| DSD<br>360 KB<br>48 tpi<br>40 TRACKS | 250 Kbps<br>SINGLE-STEP<br>MEDIA STATES<br>(0,3) | 300 Kbps<br>DOUBLE-STEP<br>MEDIA STATES<br>(1,4) |
| HC<br>1.2 MB<br>96 tpi<br>80 TRACKS | NOT<br>ALLOWED | 500 Kbps<br>SINGLE-STEP<br>MEDIA STATES<br>(2,5) |

DISKETTE DRIVE TYPE DETERMINATION

This is a continuation of application Ser. No. 630,610, filed Jul. 13, 1984, now abandoned.

BACKGROUND OF THE INVENTION

This application is accompanied by a microfiche appendix of one microfiche having thirty-four frames.

Computer systems very often require large amounts of storage. Magnetic disks very often supply mass storage for computer systems. Diskettes, sometimes called floppy disks, are a popular, low-cost type of magnetic disk.

As with most areas of computer technology, there has been a continuing increase in the performance of floppy disks for succeeding generations of computers. For floppy disks, increased performance is mostly measured by increased storage capacity, that is, a larger number of bits of storage on one disk. Increased disk capacity can generally be accomplished by either increasing the circumferential density or by increasing the radial density. The circumferential density, that is, the number of bits per inch of track, is usually limited by the disk media. Improved disk composition allows a greater number of magnetic domains in the same length of the track. Of course, the disk drive must be capable of reading at the higher bit rate of the improved disk media. Radial density, that is, the separation between adjacent tracks on the disks, is more strongly dependent upon the design of the disk drive and its associated reading heads. In the past, improvements to the disk system have involved an integrated upgrading of the disk drive, the disk media and the disk controller with operational parameters, such as rotational speed, optimized for the combination of the disk drive and the disk media. Although these designs have produced superior disk systems to those previously available, the improvement has presented a compatibility problem. Disks prepared by a prior generation disk system are generally not readable by the newer generation of disk system. The result is the lack of portability between the different generations of computer systems. The lack of compatibility becomes acute when the user has compiled a large stock of software on an older computer system and wishes to upgrade his computer or possibly just his disk system. He is then faced with the problem of converting his expensive software and data from the old format to the new format disk. The problem of differing disk formats may arise, not from a generational upgrading, but simply from different characteristics of disk drives from different manufacturers. For purposes of this invention, format will denote not only the arrangement of data on a disk but also the operational parameters of the drive that need to be selected to successfully access the disk. Both the disk media and the disk drive affect compatibility.

Of course, a possible solution is for the user to connect both an old style disk and a new style disk to his computer. The old style disk can be used for reading the previously generated disk and possibly writing on disks to be transported to other users who are still confined to the old style disk system. The newer disk can be used for his higher performance applications. This duplicative approach to compatibility has the obvious drawback of requiring at least two disk drives. Furthermore, in integrated computer systems, such as are being marketed in the personal computer field, the duplicative approach lacks flexibility. Some customers may have developed a large library of old style disk and would therefore require both generations of disk drives. However other customers may prefer the additional capabilities provided by the new style disks. Furthermore, the needs of a particular customer may change over time, either over a short term or a long term. While at some time the customer may want the combination of old style and new style disks, at other times, he may prefer to operate with two new style disks.

Another possible solution to the compatibility problem is to design a disk drive which can be reconfigured to read different types of disk media. Generally, this would mean that a newer style disk drive could operate in additional modes to support older style disks.

A reconfigurable disk system that accepts either differing disk drives or differing disk formats, if a particular disk drive can read and write in different formats, requires some input to the system. It is conceivable that external switches can be manually set by the user to indicate the type of disk drive or the type of disk media format. A more sophisticated, though similar approach, is for these controls to be set by the software. However, in either case, the disk user must keep track of the disk drive and the format of the particular disk currently being used. As a result, the adaptive feature of the disk system is not transparent to the user.

SUMMARY OF THE INVENTION

Accordingly, it is an object of this invention to provide a disk system that is adaptive to differing disk drives.

It is yet a further object of this invention to provide a disk system that is dynamically adaptive.

Yet another object of this invention is to provide a disk system whose adaptive functions are transparent to the applications program and to the user.

The invention can be summarized as an adaptive disk controller that determines the type of disk drive at machine power-up by instructing the disk reading head to traverse to a track on the far side of the most radially dense disk drive. A disk drive which cannot support such a large number of tracks will cause the disk head to become aligned to the wrong track. This misalignment is detected by stepping back to the mechanical home track indicator on the near side of the track.

DETAILED DESCRIPTION OF THE PREFERRED EMBODIMENTS

Figure 1:
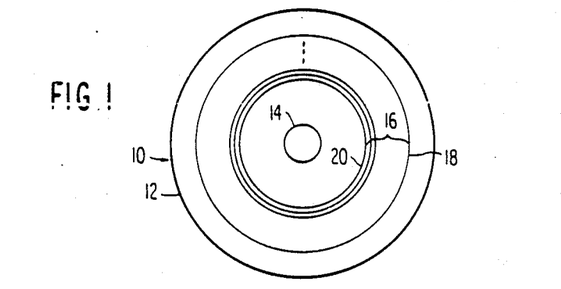
FIG. 1 is an illustration of a floppy disk.

The general format of a floppy disk 10 is illustrated in FIG. 1. The diameter of the outer circumference 12 provides a common designation for the disk 10. Two commonly sized disks are 8" disks and 5¼" disks. A sprocket hole 14 fits a spindle of a disk drive. Recording is performed on circumferential tracks located in an active area 16 of the disk 10. The outermost track 18 is called the home track and the disk drives are usually constructed such that the read head can travel only between the home track 18 and an innermost track 20.

A particular format will now be described for a double sided disk (DSD). DSD is a non-generic term and there are double sided disks which do not conform to the DSD format. A DSD disk can accommodate 360K bytes of formatted data on the two sides of the disk. There are 40 tracks and they are spaced at 48 tracks per inch. The disk spins at 300 rpm and data is recorded at 250K bits per second (Kbps). The difference between these parameters and the total disk capacity is explained by the necessity for using part of the disk for disk formatting information. The format for DSD is the MFM (modified frequency modulation) format applied to a 5¼" disk. The MFM format is detailed in the 1982 catalogue of NEC Electronics U.S.A., Inc. available from that corporation at Natick, Massachusetts. The description is presented at pages 470-472. The DSD format was used for the diskette drive adaptor incorporated into the Personal Computer XT of the IBM Computer and its use is described in "Personal Computer XT Hardware Reference Library: Technical Reference", April 1983 edition, available from the IBM Corporation at Boca Raton, Florida.

Another disk format is the HC (high capacity) format, again a non-generic term. The HC format is the MFM format applied to an 8" disk that has been scaled down to a 5¼" disk. An HC disk can accommodate 1.2M bytes of formatted data on the two sides of the disk. There are 80 tracks and they are spaced at 96 tracks per inch. Accordingly, the active area 16 of the HC disk is equal to that of the DSD disk but the HC disk has twice the radial track density. The HC disk spins at 360 rpm and data is recorded at 500K bits per second. Once again, the difference between these parameters and the total disk capacity is explained by the required disk formatting information.

Figure 2:
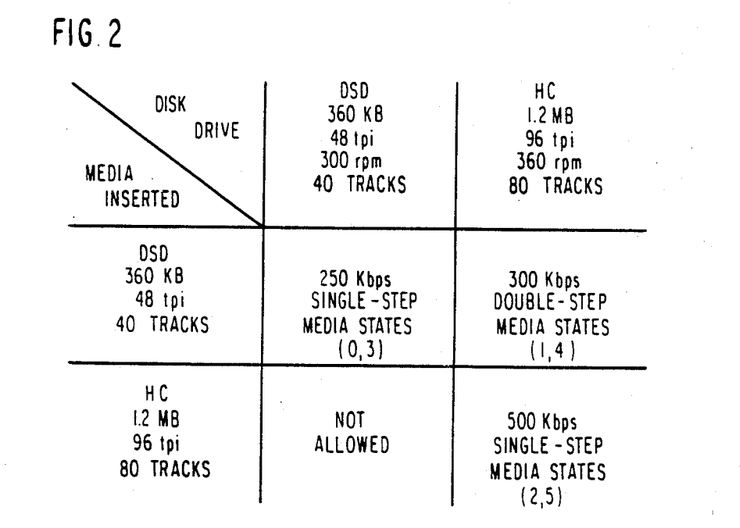
FIG. 2 is a table of the various combinations of disk drives and disk media that can be determined by the invention.

A diskette system has been proposed which can accept two diskette drives. The two drives may be any combination of DSD drives and HC drives, depending upon the needs of the user. The characteristics of the disk drives and of the media which they will accept is illustrated in FIG. 2. The DSD drive will accept only DSD formatted disk and is represented by the diskette drive of the PC XT. The HC disk drive is a new drive that is specifically designed to accept HC formatted diskettes. However, the HC drive has been designed so that it, at a minimum, can read both HC and DSD disks. The HC drive thus provides upward compatibility because it accepts disks generated by the prior generation of DSD disk drives. This upward compatibility is particularly important in the proposed system when the user decides not to buy the DSD disk drive but may, on occasion, wish to use a DSD disk.

Because of the differing spin rates in the DSD format and the HC format, the HC drive reads data from a DSD disk at 300K bits per second. As previously mentioned, the track density on a DSD disk is one-half the track density of the HC disk. The read/write head on the disk drives are positioned by stepping motors which advance or retreat one step between adjacent tracks. That is, they single step between adjacent tracks when they are reading their like formatted disks. However, when a HC drive is accessing a DSD disk, the HC drive must double step between adjacent DSD tracks.

Interfacing the proposed diskette system to the computer presents several problems. First of all, the user's selection of DSD and HC disk drives is not a priori known by the operating system or the disk controller. It is of course possible that additional toggles are provided on the disk controller to indicate the type of disk or, alternatively, the user may initialize the operating system to configure it for the particular combination of disk drives actually being used. However, it is much more desirable if the disk controller can somehow interrogate the attached disk drive to determine its type. It is further desirable if this determination can be made without the use of additional hardware.

A second problem arises when a HC disk drive is being used. Even after the drive type has been determined, the user may alternately be inserting into the HC drive either a DSD disk or an HC disk. Once again, the user could possibly provide the media identification by use of toggles or software input. However, because of the frequent changes of the disk media into a disk drive, a user determination of the disk media presents an even greater distraction to the user than does the drive determination. Once again, it is highly preferable that the media determination be performed automatically without the use of additional hardware.

Figure 3:
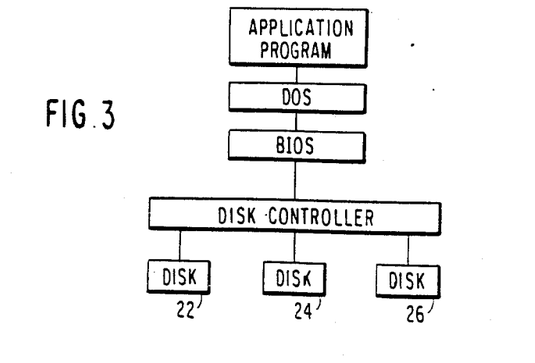
FIG. 3 is an illustration of the program and hardware hierarchy of a computer system using disks.

In FIG. 3 is illustrated the different operational levels associated with the computerized use of a disk. An application program is the operating program, often written by the user, for performing the desired task. The disk operating system (DOS) is a generic operating system that is specifically designed to support the use of disk. One version of DOS is MS/DOS developed by the Microsoft Corporation. Other types of operating systems can be used as long as they can support the I/O supervisor. A basic input/output system (BIOS) is an I/O supervisor for a particular computer and is used for supporting general classes of I/O devices. A disk controller constitutes the hardware necessary to support one or more disk drives 22-26. For the proposed system, two of the disks 22-26 may be floppy disks, in any combination of DSD disk drives and HC disk drives. The invention uses hardware already available in the disk controller and additional software in BIOS to determine either the characteristics of the disk drives 22-26 or the disk media being used in those drives.

Figure 4:
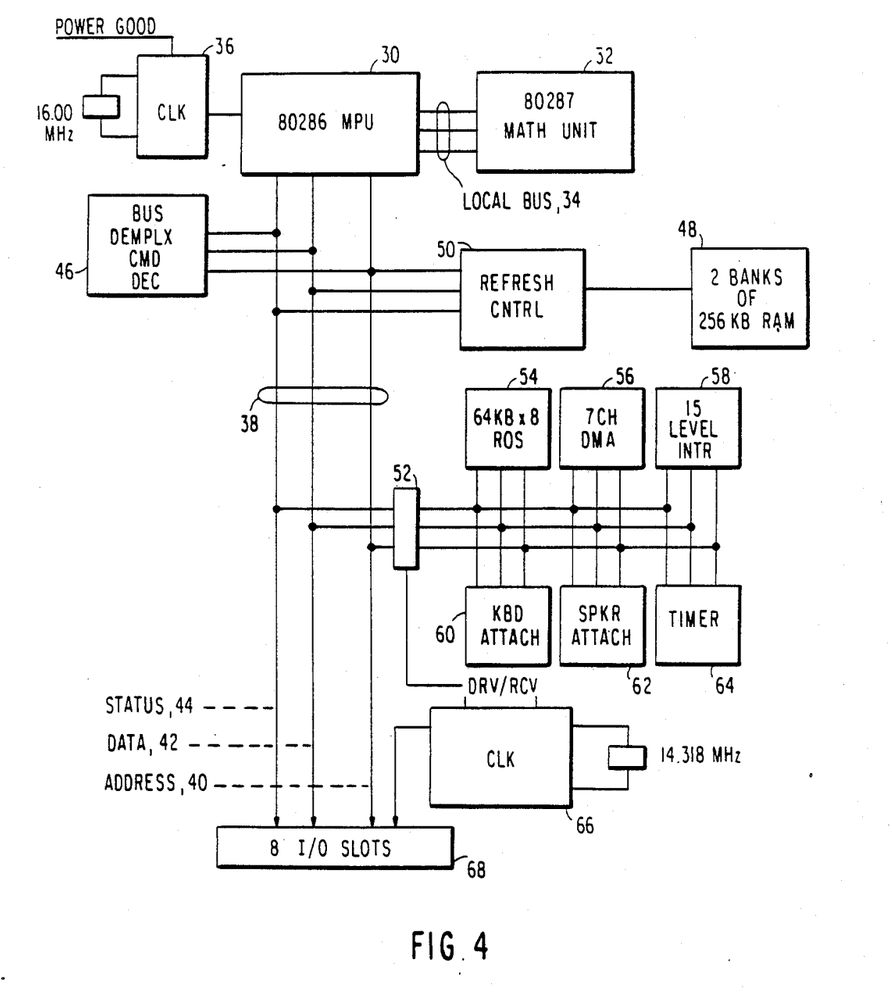
FIG. 4 is a schematic diagram of a proposed computer system.

The general architecture of a proposed computer system intended to operate in conjunction with this invention is illustrated in FIG. 4. The processing is performed by an 80286 microprocessor 30 and an 80287 match unit 32 attached to the microprocessor 30 by a local bus 34. Both the 80286 and the 80287 are available from the Intel Corporation. The microprocessor is driven by a 16 MHz clock 36 although the 80286 is operating at 8 MHz. Communication to the rest of the computer system is carried over an I/O channel 38 carrying address lines 40, data lines 42 and various status lines 44 such as the interrupt request line. A bus demultiplexer and command decoder 46 controls the interface between the I/O channel 38 and the microprocessor 30. Two banks of 256 kilobytes of random access memory 48 are connected to the 80286 microprocessor 30 through a refresh controller 50. Also attached to the I/O channel through a driver/receiver 52 are 64 kilobytes of read only storage 54, a 7 channel direct memory access unit 56, a 15 level interrupt controller 58, a keyboard attachment 60, speaker attachment 62 and a timer 64. The previously mentioned DOS operating system is stored in the RAM 48 and the BIOS supervisor is stored in the read only storage 54. A 14.318 MHz clock 66 provides a clocking function for the driver/receiver 52 and for other cards attached to the I/O channel. The above components are all included in a large baseboard which further includes 8 I/O slots 68 for whatever cards are selected by the user for additional computer capabilities. Each of the 8 I/O slots 68 has terminals to each line of the I/O channel 38 as well as the clocking signal from the clock 66.

One of the cards that can be fit into one of the I/O slots 68 is called a dual card. A dual card is a disk controller and can control up to four disks. Two of the disks can be fixed or hard disk drives and up to two of the disks can be floppy disk drives, either DSD drives or HC drives. The particular combination of the drives is determined by the user and the object of this invention is to make the use of any selected combination as transparent as possible to the user.

The floppy diskette function of the dual card is, for the most part, compatible with the existing IBM Personal Computer diskette attachment, as is detailed in the previously mentioned Personal Computer Technical Reference Manual. The exceptions are as follows. The diskette controller will control only two floppy disk drives at most. The digital output register is defined according to Table 1.

TABLE 1

| BIT 0 | = | DRIVE SELECT, 0-DRIVE A |
| BIT 1 | = | RESERVED |
| BIT 2 | = | FLOPPY FUNCTION RESET |
| BIT 3 | = | ENABLE FLOPPY INTERRUPTS AND DMA |
| BIT 4 | = | DRIVE A MOTOR ENABLE |
| BIT 5 | = | DRIVE B MOTOR ENABLE |
| BIT 6 | = | RESERVED |
| BIT 7 | = | RESERVED |

The floppy disk function will support 4 data rates: 125, 250, 300 and 500 kilobits per second. The 125 kilobits per second rate is irrelevant to this invention and will not be further discussed. All the remaining data rates conform to the MFM format. The floppy control register is added at I/O address $3F7_H$ or, if the secondary space is used, at $377_H$. The floppy control register is a 4 bit write-only register and is defined according to Table 2.

TABLE 2

| BIT 1,0 | = | FLOPPY DISKETTE, DATA RATE 00-500 Kbps, 01-300 Kbps 10-250 Kbps, 11-125 Kbps |
| BIT 2 | = | RESERVED |
| BIT 3 | = | RESERVED |

Note that the floppy disk interface signal REDUCED WRITE CURRENT is the logical inverse of Bit 0, that is, when 300 Kilobits per second is selected, then REDUCED WRITE CURRENT is active. In addition, there is an 8 bit read-only digital input register for diagnostic purposes. The digital input register bits 0-6 are valid 50 microseconds after the drive/head register is written. Bit 7 is always valid. The digital input register is defined according to Table 3.

TABLE 3

| BIT 0 | = | DRIVE SELECT 0 |
| BIT 1 | = | DRIVE SELECT 1 |
| BIT 2 | = | HEAD SELECT 0 |
| BIT 3 | = | HEAD SELECT 1 |
| BIT 4 | = | HEAD SELECT 2 |
| BIT 5 | = | HEAD SELECT 3/REDUCED WRITE CURRENT |
| BIT 6 | = | WRITE GATE |
| BIT 7 | = | DISK CHANGE |

The fixed disk register is added at I/O address $3F6_H$ or, if the secondary space is used, at $376_H$. The fixed disk register is a 4 bit write-only register and is defined by Table 4.

TABLE 4

| BIT 0 | = | RESERVED |
| BIT 1 | = | − ENABLE FIXED DISK INTERRUPTS |
| BIT 2 | = | + RESET FIXED DISK FUNCTION |
| BIT 3 | = | − REDUCED WRITE CURRENT/ + HEAD SELECT 3 (PIN 2) |

The attachment supports up to 80 tracks and up to 15 sectors per track with each sector comprising 512 bytes. The floppy disk function provides 125 nanosecond write pre-compensation for all data rates.

The floppy disk function is based on a diskette controller such as the 765A available from NEC or the 8272A available from the Intel Corporation. The 765A is described in detail in the previously cited NEC catalogue.

Figure 5:
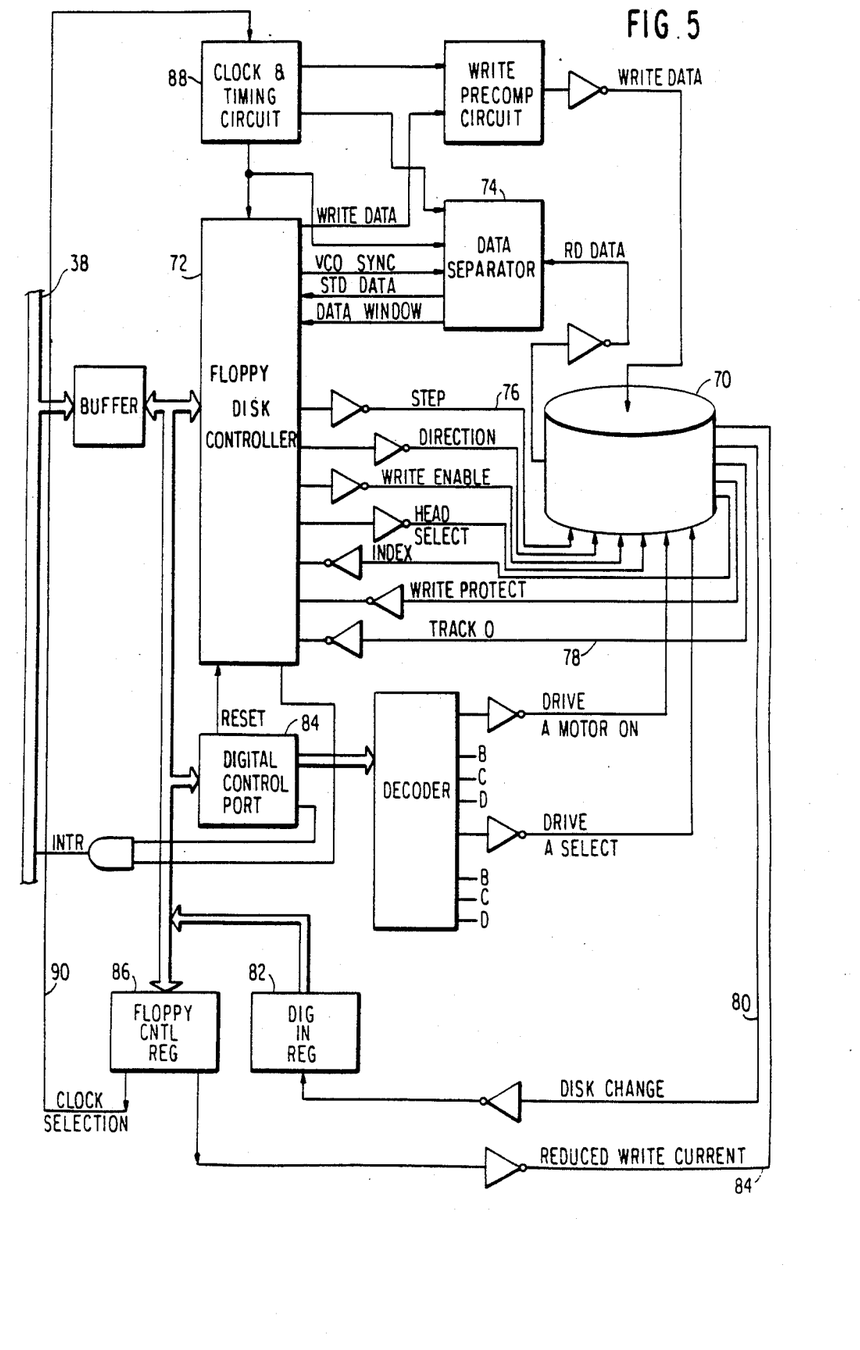
FIG. 5 is a schematic diagram of a disk controller usable with this invention.

The architecture of the circuitry surrounding the floppy disk controller is illustrated in FIG. 5, which shows the interface between the I/O channel 38 and one of the floppy disk drives 70 whether it be a DSD drive or HC drive. The same interface supports two drives. This architecture is the same as that described in the previously cited IBM Personal Computer Technical Reference Manual but a few important facts should be pointed out. A floppy disk controller 72 such as the 765A, provides the intelligence for the interface. Data from the disk drive 70 is read into the controller 72 through a data separator 74 which synchronizes the read data. This synchronization function is particularly important for the present invention because data may be read at three different data rates, 250, 300 or 500 kilobits per second. A STEP input 76 to the disk drive 70 steps the read/write head across the diskette. However, the read/write head of the disk drive 70 cannot exceed the bounds of the active area 16 of the diskette. If signals on the STEP input 76 are received by the disk drive 70 that would drive the head beyond the active area 16, these signals are ignored and the read/write head remains at the extreme track. There is an output TRACK_0 78 from the disk drive 70 that indicates that the read/write head is positioned at the home track 18.

There is an additional output line from the disk drive 70 when the disk drive 70 is an HC drive rather than a DSD drive. A DISK CHANGE output 80 from an HC disk drive 70 goes true, i.e., low, at the output from the HC drive 70 when power is turned on and whenever the disk media is removed from the drive 70. The DISK CHANGE signal remains true until both the following conditions have been met: the diskette is present in the disk drive 70 and a pulse on the STEP line 76 has been received by the drive 70 when it is selected. The presence of the diskette is determined by a media sensor within the disk drive 70. A latch is set by the removal of the disk media and will only be reset by an AND condition of media presence and a pulse on the step line 76. The DISK CHANGE line 80 is connected to an input of a digital input register 82, which may be interrogated by the system software. Other data, not directly pertinent to this invention, are also stored in the digital input register 82.

A REDUCED WRITE CURRENT line 84 is also connected to an input of an HC disk drive 70 but not to a DSD disk drive. The write current for a DSD disk is lower than for an HC disk. Accordingly, the write current of an HC disk drive is reduced when the HC drive 70 is writing on a DSD disk in order to prevent bleedthrough between tracks. The signal to the REDUCED WRITE CURRENT line 84 is output from a floppy control register 86 which can be written into from the I/O channel 38 in order to select a data rate for a disk operation.

Because the diskette controller must read and write at three different data rates, 250, 300 and 500 Kbps, a clock and timing circuit 88 is provided which is selectable between these rates based on a floppy disk data rate signal available on a CLOCK SELECTION line 90 from the floppy control register 86. The selectable clock rate drives the floppy disk controller 72, the data separator 74 and the rest of the disk controller of FIG. 5. Thus the I/O channel 38 must reload the floppy control register 86 when the HC drive 70 changes between DSD and HC disk media or a DSD drive is selected.

Figure 6:
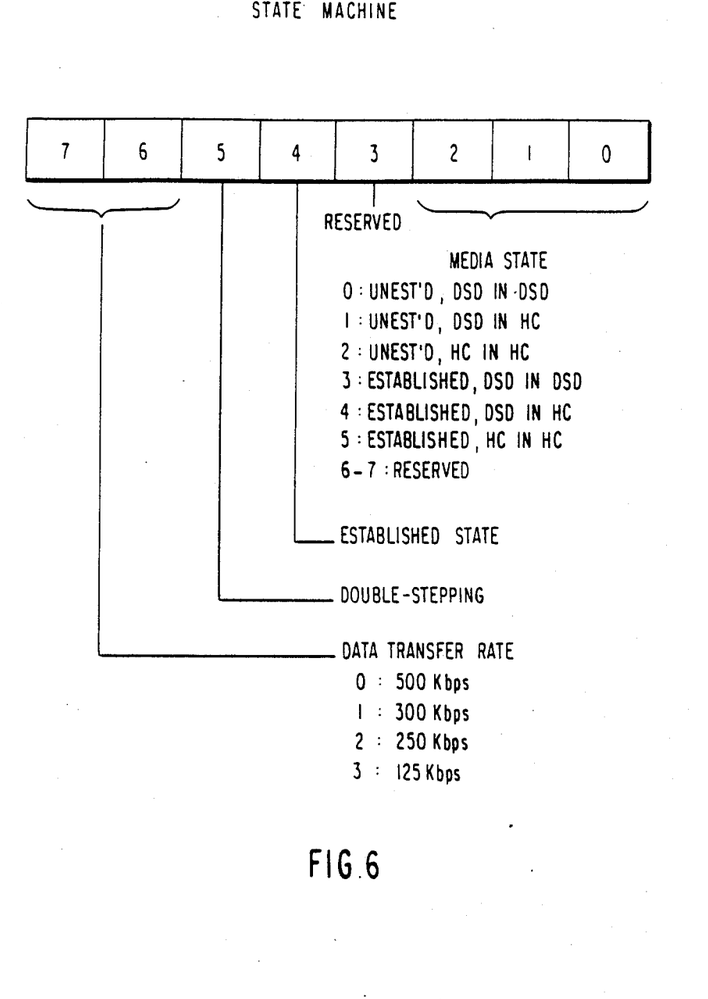
FIG. 6 is an illustration of the format of the state machine used by this invention.

BIOS is the I/O supervisor for the computer system. There are many BIOS arrangements used in the microcomputer field, and a complete listing of BIOS is not necessary for a complete and proper understanding of this invention. Nevertheless, by way of example only, a BIOS listing has been provided in the form of microfiche deposit at the U.S. Patent and Trademark Office. BIOS maintains in RAM 48 16 bytes of status information for the disk controller insofar as it interacts with floppy disk drives. Two of these bytes are called the state machines and one state machine is associated with each of the two possible floppy disk drives. The format of each of the bytes of the machine state is illustrated in FIG. 6. The first three bits 0-2 represent a media state. Only six of these states are defined. State 0 is an unestablished state for a DSD disk media in a DSD disk drive. By unestablished is meant that the state is tentative and has not yet been positively determined. This determination will be described later. State 1 represents an unestablished state of a DSD disk media in an HC disk drive. State 2 represents an unestablished state of an HC disk media in an HC disk drive. States 3-5 represent established states and correspond to the unestablished states having a value of 3 lower. Bit 4 of the state machine represents whether the media state of the lower 3 bits has already been established. Bit 5 indicates whether double stepping is required. Double stepping is required for media states 1 and 4 when a DSD disk is used in an HC disk drive. Finally, bits 6 and 7 represent the data transfer rate which has been determined for this drive. For instance, a value of 00 represents a data transfer rate of 500 Kbps, a value of 01 represents 300 Kbps, a value of 10 represents 250 Kbps and a value 11 represents 125 Kbps.

Figure 7:
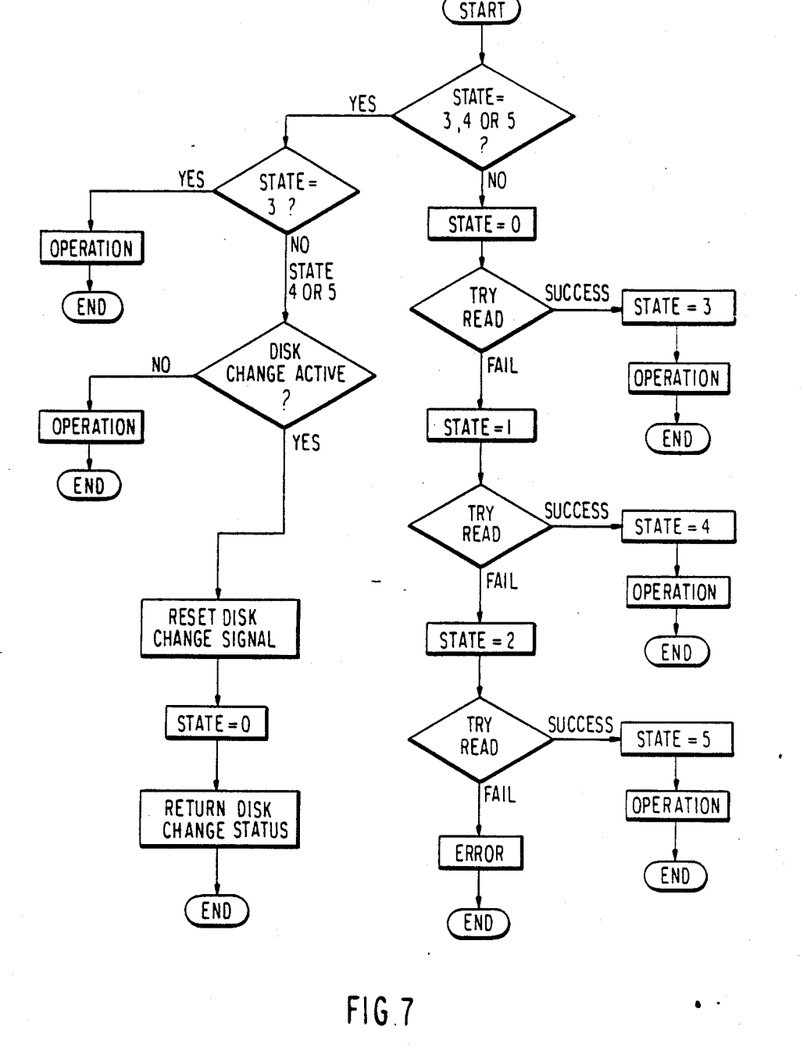
FIG. 7 is a flow diagram illustrating a first method for determining two types of disk drive and disk media.

There are at least three methods of using the previously described apparatus to determine the disk drive type and/or to determine the disk drive media. These methods will be separately described. In the first method, a single sequence of steps is used to determine both the disk drive type and the disk media. The first method is not a fundamental part of the present invention but is the subject of a co-pending patent application entitled "Diskette Drive and Media Type Determination", Ser. No. 630,608, filed July 13, 1984, by Berens et al. The flow diagram for this method is illustrated in FIG. 7. In the initialization following machine power-up or on the occurrence of a soft reset, the state machine for each disk drive is initialized. The default media state 0 is set and bit 4 is set to indicate that the media state is not established. Thereafter, whenever the diskette portion of the BIOS is invoked for a particular disk drive, bit 4 of the state machine for that drive can be tested to see if the media state has been established, that is, whether the media state is state 3, 4 or 5. If the media state is established, then the diskette access proceeds according to the presently set media state. If the media state is state 3, then the diskette operation continues to completion, after which BIOS relinquishes control to the application program. If, however, the media state is state 4 or 5, the DISK CHANGE status is interrogated to determine if it is active. Only an HC drive, for which states 4 and 5 are proper, provides the DISK CHANGE status. If the disk media has not been changed, as indicated by an inactive DISK CHANGE, then the disk operation is performed and control returns to the application program. On the other hand, if the disk in the HC drive has been changed, BIOS attempts to reset the DISK CHANGE signal by issuing sequential seek commands to track 1 and to track 0. If a disk media is currently inserted, one of these seeks will cause the DISK CHANGE signal to be reset inactive. The media state is reset to the default state 0 and the new, possibly reset, DISK CHANGE status is returned to the system. The application program then reassumes control to determine its preferred course of action.

However, if the initial test at bit 4 indicates an unestablished state, that is, state 0, 1 or 2, then the default media state of state 0 is set. BIOS will then instruct the disk controller to attempt the read with the current media state. State 0 tentatively identifies a DSD disk in a DSD drive. What track and sector is read is not important as long as the track and sector would be on either type of disk. The reading test also depends upon the disk being properly initialized, though it is not necessary that a typical disk be filled with data. Disk initialization is typically done by the manufacturer so that even new disks can often be used with this method. Part of the disk initialization process is to provide a sector identification for each sector on the disk. The floppy disk controller 72 requires that it read a valid sector identification for a successful access operation. If the floppy disk controller does not recognize a valid identification, the operation is considered a failure. BIOS retrieves several bytes of status information from the disk controller following an operation and stores it in RAM 48. Error codes in this status information include a bit for an unsuccessful operation. BIOS can then interrogate RAM 48 as to whether the operation was successful. If the read was successful, as indicated by the lack of a failure signal, BIOS changes the media state to state 3, an established state, and sets bit 4 of the machine state to reflect this establishment. For reasons to be described below, a successful read will have occurred in state 0 only if a DSD disk was read in a DSD drive.

Thereafter, the state for the disk drive is established and operation proceeds for this drive access and for subsequent accesses to this drive. After the invoked operation is performed, control returns to the application program. If, however, the disk drive being accessed was an HC drive, the attempted reading would have necessarily been unsuccessful. If the HC drive contained a DSD disk media, the reading rate would have been required to be 300 Kbps rather than the 250 Kbps of state 0. Similarly, a successful read of an HC disk media in an HC disk drive would have required a data rate of 500 Kbps. In either of these conditions, the attempted reading would have been unsuccessful.

Upon the detection by BIOS that a state 0 read was unsuccessful, the media state is tentatively identified as state 1, that is, a DSD disk media in a HC drive. If the reading attempt is successful, the state is established as state 4 and bit 4 of the machine state is set to indicate an established state. Thereafter, the disk access is completed in the established state and then control returns to the application program. Subsequent accesses to this drive proceed using state 4.

However, if the disk media is removed, the DISK CHANGE signal of FIG. 5 is read into the digital input register 82. BIOS will read the digital input register 82 prior to the next floppy operation and will detect that the DISK CHANGE signal is active. The sequence of activity on the next floppy operation in the presence of an active DISK CHANGE signal follows the sequence described above.

If the attempted read in state 1 is for an HC disk media in an HC disk drive, the reading attempt would have failed because of the differing required data rates. Then BIOS makes one more attempted read with the media state set to state 2, indicating an HC disk media in an HC disk drive. If this read is successful, the media state is established at state 5 and bit 4 of the machine state is set to the established state. Thereafter, the accessing continues for both this access and for succeeding accesses as long as the disk media is not removed. Control returns to the application program after the first access.

If the third attempted read, that is, the one in state 2, is not successful, then an error is indicated because all the allowed posibilities have been exhausted. In this case, the media state defaults to state 0. The error may have been caused by a random reading error so that it may be worthwhile for the application program to again attempt the determination for drive and media illustrated in FIG. 7. However, it is also possible that the disk media is faulty or is of a format that is not recognizable by the disk drive into which it is inserted. For example, an HC disk is not readable by a DSD disk drive. Therefore, if a second pass through the sequence of FIG. 7 is allowed, some means should be provided to exit the loop after a reasonable number of attempts to prevent the disk controller from entering an infinite loop.

Instead of attempting a read operation to the disk media, it would also be possible to attempt a write operation, particularly if the invocation of BIOS was caused by a write request. However, this presents difficulties if the write request was to an HC disk in an HC drive. In this case, the attempted write in state 1, indicating a DSD media in an HC drive, would cause double stepping to the requested track. The write head would stop at a track that is twice the distance from the home track as the requested track in the correct format. As a result, the wrong track would be attempted to be overwritten in the unsuccessful write attempt. If the writing were part of a format command, the overwriting would be successful.

The second method will now be described. This method allows the determination of the type of disk drive that is being used by the system. It is to be remembered that the proposed computer system can support one of two types of disk drives, a DSD drive and an HC drive. The choice of disk drives is left to the user and either type may be inserted in either of the two slots provided for disk drives. Furthermore, it is possible that one or both of the slots is left vacant. By means of the various embodiments of this invention, the determination of the disk drive type can be determined by the system software without hardware modification or user interaction.

Figure 8:
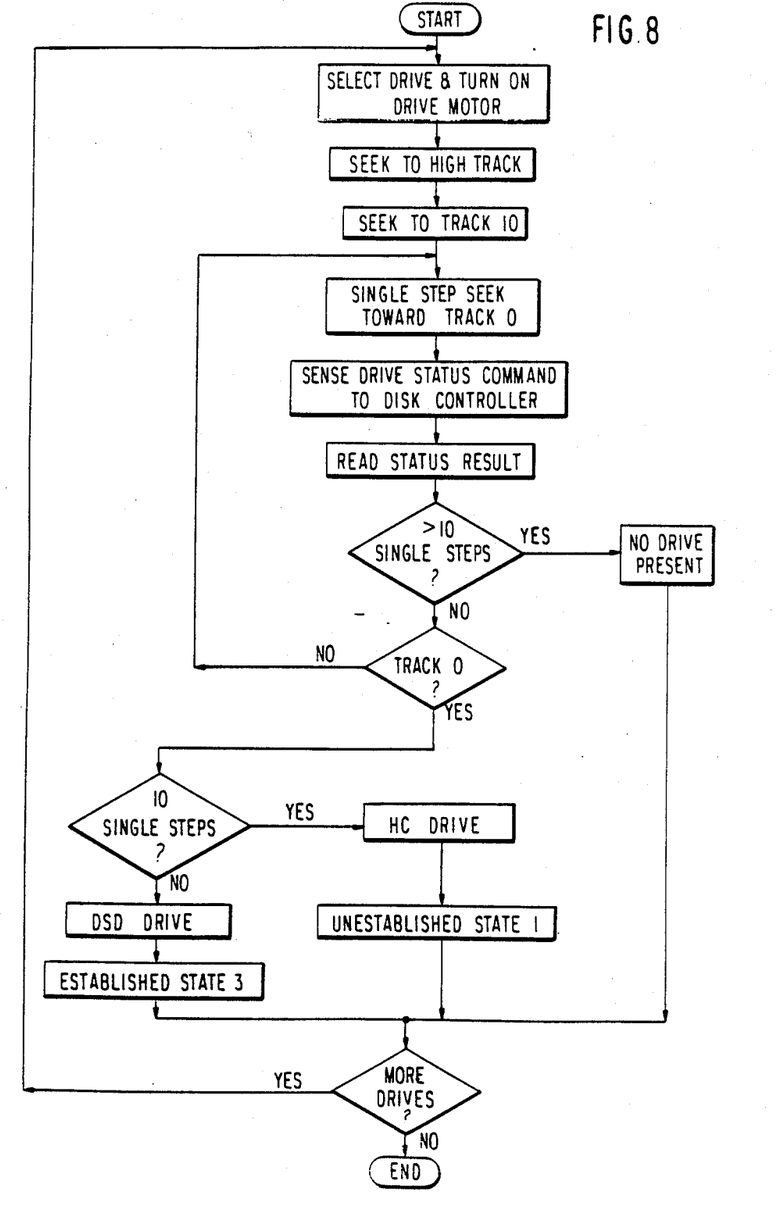
FIG. 8 contains a flow diagram illustrating a second method for determining the type of disk drive.

At system power-up or soft reset, the second method begins, as illustrated in the flow diagram of FIG. 8, with the BIOS software selecting one of the drives and turning on the drive motor. Then the read/write head is instructed to seek to a high track, that is, to move to a position over a high track. By a high track is meant a track number that is higher than the maximum number of tracks on a DSD disk media but less than the maximum number on a HC disk media. For instance, the high track could be track 45. It is not necessary in this seek operation that a disk media be inserted into the disk drive because only the disk drive is being tested. A seek to the high track in an HC drive will cause the read/write head to be correctly positioned in the active area 16 of the disk and to be above the correct high track. However, in a DSD drive, the read/write head will seek to the innermost track 20 and will be mechanically stopped at that point. Further stepping pulses in the same direction will not produce further movement. However, the floppy disk controller will nonetheless record that the read/write head of the DSD drive is positioned at the non-existent high track.

Thereafter, the read/write head is moved in the opposite direction by an instruction to seek to track 10. For an HC drive, the head will, as a result, be positioned over track 10. However, for a DSD drive the floppy disk controller has lost track of the correct position. If the high track has been selected as track 45, a subsequent seek back to track 10 will actually cause the read/write head to be positioned on track 5.

Then the read/write head is brought back further toward the home track 18 by single steps. After each single step, the floppy disk controller, under the instructions of BIOS, issues a command to sense the drive status of the disk drive and then BIOS reads from the floppy disk controller 72 the result of this status inquiry. One piece of status information so transferred is the TRACK_0 signal which indicates if the read/write is positioned at the home track 18. Following the reading of the status, a test is made to whether more than 10 single steps have been performed since the read/write head was at track 10. If the answer is affirmative, then no drive is present because the only situation in which this condition could have been reached is that track 0 was not detected because there is no physical drive. The determination of a lack of a drive ends the determination process for this particular slot and the sequence continues for possibly remaining drives at different slots.

However, if there have been 10 or less single step seeks, BIOS tests whether there is an active TRACK_0 signal. If the TRACK_0 signal is not active, then another single step seek toward track 0 is executed and the loop is repeated. If the TRACK_0 signal is active, then BIOS determines if there have been exactly 10 single step seeks since the read/write head was at track 10. If there have been exactly 10 single steps, and since the TRACK_0 signal is active, then it has been determined that the head is correctly positioned on the home track 18 and that the disk drive is necessarily an HC drive. In this case, the media state of the state machine is set to state 1, an unestablished state, and bit 4 of the state machine is cleared to indicate the lack of establishment. On the other hand, if there have not been exactly 10 single steps but the TRACK_0 signal is active, then the floppy disk controller 72 is currently recording an incorrect position for the read/write head. This will have occurred, as previously described, because the head of a DSD drive was attempted to be overdriven beyond the innermost track 20. Accordingly, the presence of a DSD drive is determined. The media state of the state machine is set to state 3 and bit 4 of the state machine is set to indicate establishment. The media state is established in this case because a DSD drive can accommodate only DSD disk media and there is no choice between established states of a DSD drive.

BIOS then tests whether all the drives have had their drive types determined. If there are no more drives, this method ends. If there are more drives, the sequence returns to the beginning for the determination of the type of another drive at its respective port.

The previous two methods involve different concepts for, in the first case, the joint determination of the disk drive an the disk media and, in the second case, for the determination of the disk drive only. However, a determination of a DSD drive necessarily determines that the disk media is also going to be of the DSD type. It is believed that system performance is improved if, upon power-up, the second method is used to determine the disk drive and possibly establish the disk media for a DSD drive. Thereafter, whenever a diskette is accessed, a media determination is made similar to that of the first method but which can rely upon the prior drive determination at power-up. This third method is described with reference to the flow diagrams of FIGS. 10 and 11. The version of BIOS which is included in the Appendix contains the software for both the second and third methods.

Figure 9:
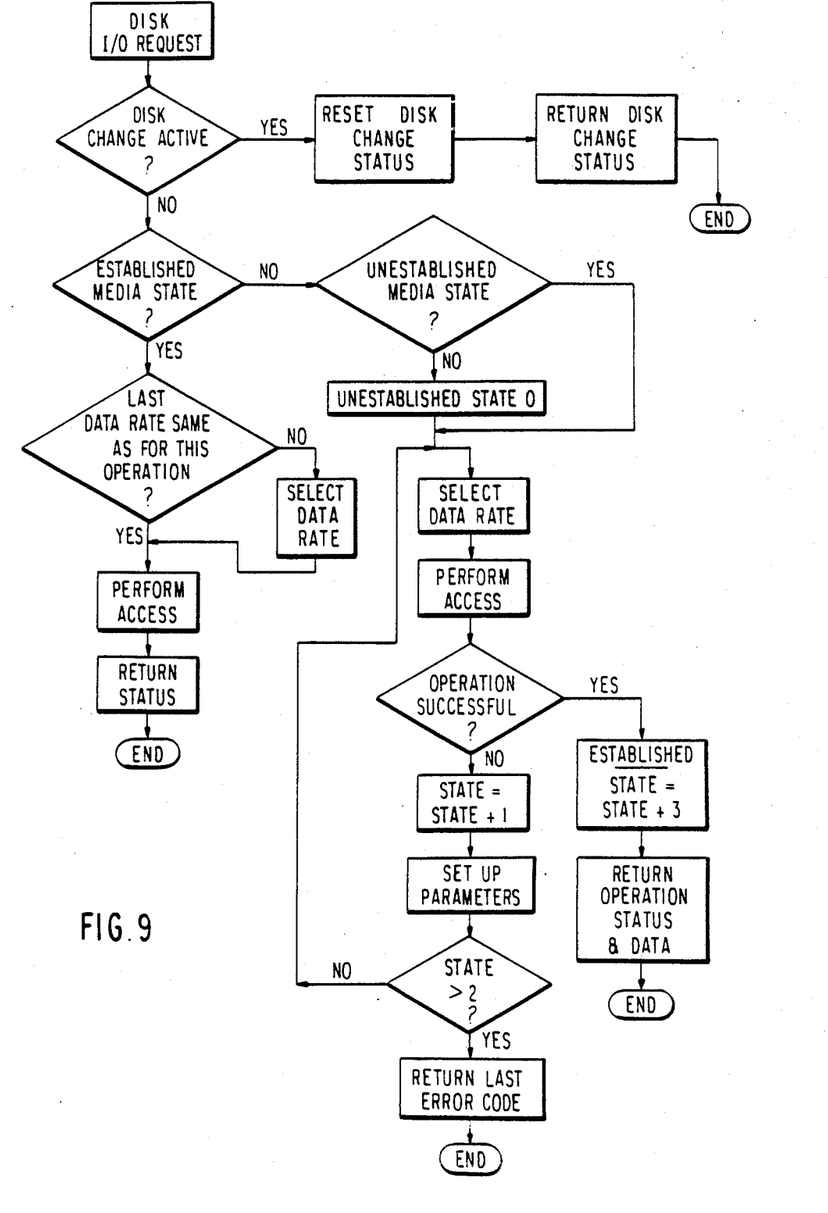
FIG. 9 contains a flow diagram illustrating a third method for determining the types of disk drive and disk media.

The third method, illustrated in the flow diagram of FIG. 9, is invoked whenever there is an I/O request for diskette access. It will be assumed that the second method has previously been invoked upon system power-up. First, a test is made as to whether the DISK CHANGE signal is active, indicating either that there is no disk in the disk drive or that it has been changed since the last disk access. If the DISK CHANGE is active, then an attempt is made to reset the disk change status by commanding the read/write head to first seek track 1 and then to seek track 0.

At least one of these seek commands will cause the issuance of a STEP signal. This will result in the disk change signal going inactive if a disk media is present. The new disk change status, resultant from the additional seeks, is then returned to the application program with an indication that there has been a change of disk. The application program has the responsibility of responding to this condition and control is relinquished by BIOS.

If, however, the DISK CHANGE signal is inactive, a test is then made as to whether the media state is an established media state, that is, state 3, state 4 or state 5. This media state could have been determined by the second method at power-up or by an intervening use of this method. If the media state is an established one, then a test is made for whether the last data rate used is the same one that is specified for the present established media state. If not, the data rate specified by the media state is selected. This test and selection is required because the same clock circuit 88 is used for all the disk drives and needs to be changed on alternating accesses to different types of drives or media. As previously mentioned, BIOS maintains 14 bytes of status information in RAM. One of these bytes contains the status of the last disk operation, including the frequency selection. This is the value that is compared against the frequency indicated by the media state for the particular drive by the state machine. Upon the selection of the proper data rate, the access to the disk is performed and the status of the disk drive is returned to the application program. At this point, BIOS relinquishes control to the application program.

If the test for an established media state resulted in a negative result, another test is made for whether the media state is an unestablished state, that is, state 0, state 1 or state 2. This further test is performed in case, for some reason, the state machine has been unintentionally wiped out, for instance, by a poorly written assembler program so that there is no presently defined media state. In this case, the media state is set to state 0 as a default value.

Then, based on one of the unestablished media states, the data rate indicated by the media state is selected in the clock circuit 88. With this selected data rate, the access to the disk is performed. Then a test is made as to whether the operation was successful, that is, whether the sector identification was read. If the operation was successful, the media state is established by incrementing the media state by 3. Then the operation status of the disk drive and, perhaps, data acquired in the access is returned to the application's program. Thereafter, BIOS relinquishes control to the application's program.

If, however, the operation was not successful, probably because the wrong data rate was selected, the next unestablished media state is selected by incrementing the media state by 1 and the disk access parameters associated with the new media state are set up. Then a test is made to determine whether all the unestablished states have been tried. This test can be performed by determining whether the incremented media state is greater than 2. If an unestablished state remains to be tried, the sequence returns to the selection of the data rate and another attempt at access and the loop is repeated. If, however, all unestablished states have been tried and none of the accesses have been successfull, then BIOS returns the last error code to the application program and relinquishes control to the application program, thereby completing the third method.

By means of the invention described above, BIOS can determine the type of disk drive currently attached to the port and possibly the media type. The determination is performed without the intervention of the user or application program and allows the system to be configured to the user's needs. Only existing hardware needs to be used.

We claim:

1. In a computer system having a device attachment port to which any one of a plurality of different types of disk drives may be attached at different times, a method for adapting the system to recognize the type of drive currently attached to said port, automatically and on a dynamic basis, comprising:
   a first issuing step of issuing a head positioning command to said port for causing the head on the currently installed drive to be moved in a first direction to a predetermined track address which is not within the range of one of said drive types, whereby the head is positioned at different tracks in drives of different types; and
   determining the track address to which said head was moved by said moving to said predetermined track address, wherein said determined address is related to the type of device attached to said port.

2. A disk controller in a computer system for a disk drive attached to a port of said controller for determining the type of said disk drive, comprising:
   means for transferring a first signal to said port, said first signal causing a head in a drive attached to said port to move in a first direction to a high track position, said high track position being inaccessible in at least one type of disk drive, said means further transferring a set of second signals to said port, each said second signal causing said head to move in a direction opposite to said first direction toward a reference track position in predetermined increments;
   means for receiving a reference track signal from said drive, said reference track signal indicating the positioning of said head in said drive at the reference track position;
   means for counting the number of second signals transferred to said port by said transferring means before said receiving means receives said reference track signal; and
   means for associating said number with the type of said drive attached to said port.

3. A disk controller as recited in claim 2:
   wherein said transferring means transfers no more than a maximum number of second signals to said port, said maximum number being greater than the number of predetermined increments necessary to move said head to said reference track position from said high track position in a drive of any possibly attached type; and
   wherein said associating means associates the counting of said maximum number of counts with the absence of a drive on said port.

4. In a computer system having a port to which any one of a plurality of different types of disk drives may be attached, each disk drive having a head, a method for recognizing the type of disk drive currently attached to said port, said method comprising the steps of:
   applying a first signal to said port, said signal directing a head on a disk drive attached to said port to move to a predetermined track address;
   determining whether said head has moved to said predetermined track address; and
   determining the type of disk drive currently attached to said port according to a result of said determining step.

5. In a computer system having a port to which any one of a plurality of different types of disk drives may be attached, each disk drive having a head, a recognition system for recognizing the type of disk drive currently attached to said port, said recognition system comprising:
   means for applying a first signal to said port, said signal directing a head on a disk drive attached to said port to move to a predetermined track address;
   first determining means for determining whether said head has moved to said predetermined track address and for providing a first determination result; and
   second determining means for determining the type of disk drive currently attached to said port in accordance with said first determination result.

6. In a computer system having a device attachment port to which any one of a plurality of different types of disk drives may be attached, a method for recognizing the type of drive currently attached to said port, said method comprising the steps of:
   issuing a head positioning command to said port for directing a head on a disk drive attached to said port to move to a predetermined track address;
   determining the track address to which said head has been moved; and
   determining the type of disk drive attached to said port in accordance with the determined track address.

7. In a computer system having a port to which any one of a plurality of different types of disk drives may be attached, each disk drive having a head, a disk controller for determining the type of disk drive currently attached to said port, said controller comprising:
   means for providing a first signal to said port for directing a head in a drive currently attached to said port to move to a predetermined track position;
   first determining means for determining the track position to which said head has moved in response to said first signal; and
   recognition means for recognizing the type of disk drive currently attached to said port in accordance with the determined track position.

8. In a computer system having a device attachment port to which any one of a plurality of different types of disk drives may be attached at different times, a method for adapting the system to recognize the type of drive currently attached to said port, automatically and on a dynamic basis, said method comprising the steps of:
   issuing a first head positioning command to said port instructing the head on the currently installed drive to be moved in a first direction to a predetermined track address which is not within the range of one of said drive types, whereby the head is positioned at different tracks in drives of different types; and
   determining the track address to which said head is moved in response to said head positioning command, wherein said determined address is related to the type of device attached to said port, said determining step comprising the steps of: issuing a further series of head positioning commands to said port instructing said head to move in fixed increments in a direction opposite said first direction to a reference track position, providing a status indication from the drive to said system when the head is returned to said reference position by said fixed increments, counting the number of fixed increments issued by said system prior to said status indication, and associating the count of said fixed increments to the type of drive currently installed at said port.

9. A method as recited in claim 8, further comprising, prior to said step of issuing said first head positioning command, the step of issuing a head positioning command to said port to cause said head to be moved to said reference track position.

10. A method as recited in claim 8, wherein said counting step further counts up to a predetermined number, said predetermined number exceeding the counts caused by any type of drive and wherein said associating step associates said predetermined number of counts with the absence of a drive in said port.

11. In a computer system having a port to which any one of a plurality of different types of disk drives may be attached, each disk drive having a head, a method for recognizing the type of disk drive currently attached to said port, said method comprising the steps of:

applying a first signal to said port, said signal directing a head on a disk drive attached to said port to move in a first direction to a predetermined track address;

determining whether said head has moved to said predetermined track address;

applying a further series of head positioning signals to said port for causing said head to move in increments in a second direction opposite said first direction, toward a reference track position;

providing a status indication from the drive to said system when said head is returned to said reference position by said increments;

counting the number of increments caused by said further series of signals prior to the providing of said status indication; and associating the count of said increments to the type of drive currently attached to said port to thereby determine the type of disk drive currently attached to said port.

12. A method as recited in claim 11, wherein said step of applying said first signal causes said head to be positioned at differently addressed tracks in attached disk drives of different types.

13. A method as recited in claim 11, further comprising, prior to said step of applying said first signal, the step of first applying a signal to said port for causing said head to move to said reference track position.

14. A method as recited in claim 11, wherein said counting step counts up to a predetermined number, said predetermined number being greater than the counts caused by any type of drive and wherein said associating step associates said predetermined number of counts with the absence of a drive in said port.

* * * * *